US010651636B2

(12) United States Patent
Brown et al.

(10) Patent No.: US 10,651,636 B2
(45) Date of Patent: May 12, 2020

(54) PORTABLE HAND TOOL AND KIT

(71) Applicant: Hubbell Incorporated, Shelton, CT (US)

(72) Inventors: Lawrence Norman Brown, Allenstown, NH (US); Thomas Romeo Faucher, Manchester, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 353 days.

(21) Appl. No.: 15/230,760

(22) Filed: Aug. 8, 2016

(65) Prior Publication Data

US 2017/0040781 A1 Feb. 9, 2017

Related U.S. Application Data

(60) Provisional application No. 62/202,592, filed on Aug. 7, 2015.

(51) Int. Cl.
*H02G 1/00* (2006.01)
*B23D 29/00* (2006.01)
(Continued)

(52) U.S. Cl.
CPC ........... *H02G 1/005* (2013.01); *B21D 39/048* (2013.01); *B23D 29/002* (2013.01); *B25B 27/10* (2013.01); *B25H 3/006* (2013.01); *H01R 43/0427* (2013.01)

(58) Field of Classification Search
CPC ...... B21D 39/048; B21D 39/04; B23D 15/04; B23D 15/14; B23D 21/10; B23D 27/02;
(Continued)

(56) References Cited

U.S. PATENT DOCUMENTS 2,765,019 A * 10/1956 Evans .................. H01R 43/058
100/233
3,594,073 A * 7/1971 Liautaud .............. G02C 5/2209
16/228
(Continued)

FOREIGN PATENT DOCUMENTS

DE 10110882 A1 9/2002

OTHER PUBLICATIONS

PCT International Search Report and Written Opinion dated Oct. 26, 2016 from corresponding Application No. PCT/US2016/045976, 12 pages.

(Continued)

*Primary Examiner* — Clark F Dexter
(74) *Attorney, Agent, or Firm* — Dilworth IP, LLC

(57) ABSTRACT

Tools for operating on an object, such as a wire or cable are provided. The tool includes a frame, and a working head assembly. The working head assembly has a movable section and fixed section secured to the frame. The movable section has a first end movably secured to a first end of the fixed section. The movable section has a second end that is releasably secured to a second end of the fixed section using a latch pin. The working head assembly also includes a latch pin stop that is positioned in the second end of the movable section. The latch pin stop is configured to prevent the latch pin from releasably securing the movable section to the fixed section until the movable section is properly aligned with the fixed section.

21 Claims, 8 Drawing Sheets

(51) Int. Cl.
  *B25F 5/00* (2006.01)
  *B21D 39/04* (2006.01)
  *B25H 3/00* (2006.01)
  *B25B 27/10* (2006.01)
  *H01R 43/04* (2006.01)
  *H01R 43/042* (2006.01)

(58) Field of Classification Search
  CPC ...... B23D 27/04; B23D 27/06; B23D 29/002; B23D 29/023; B25F 5/005; B26D 3/167–169; H01R 43/042; H01R 43/0421; H01R 43/0427; H01R 43/0428; H02G 1/005; B25B 27/10; B25H 3/006; F16P 3/12
  USPC ......... 30/182, 186–188, 194, 241, 244, 245, 30/272.1, 277.4; 403/20, 27
  See application file for complete search history.

(56) References Cited

U.S. PATENT DOCUMENTS

| | | | |
|---|---|---|---|
| 4,845,849 A * | 7/1989 | Aubriot | B23D 21/10 30/92 |
| 5,195,354 A | 3/1993 | Yasui et al. | |
| 5,611,228 A * | 3/1997 | Dummermuth | B25B 27/10 192/129 A |
| 6,085,422 A * | 7/2000 | Hirabayashi | B23D 29/002 30/122 |
| 6,101,862 A | 8/2000 | Rzasa et al. | |
| 6,324,884 B1 | 12/2001 | Barjesteh et al. | |
| 6,792,789 B1 * | 9/2004 | Faucher | B21D 39/048 72/409.16 |
| 7,165,439 B2 | 1/2007 | Lefavour et al. | |
| 8,904,848 B2 * | 12/2014 | Frenken | B21D 39/048 72/402 |
| 2001/0027676 A1 | 10/2001 | Frenken | |
| 2013/0042460 A1 * | 2/2013 | Frenken | B21D 39/048 29/505 |
| 2015/0151367 A1 * | 6/2015 | Frenken | B23D 23/00 83/467.1 |
| 2018/0006437 A1 * | 1/2018 | Frenken et al. | H02G 1/005 |

OTHER PUBLICATIONS

Extended European Search Report dated Mar. 27, 2019 from corresponding EP Application No. 16835742.4, 9 pages.

* cited by examiner

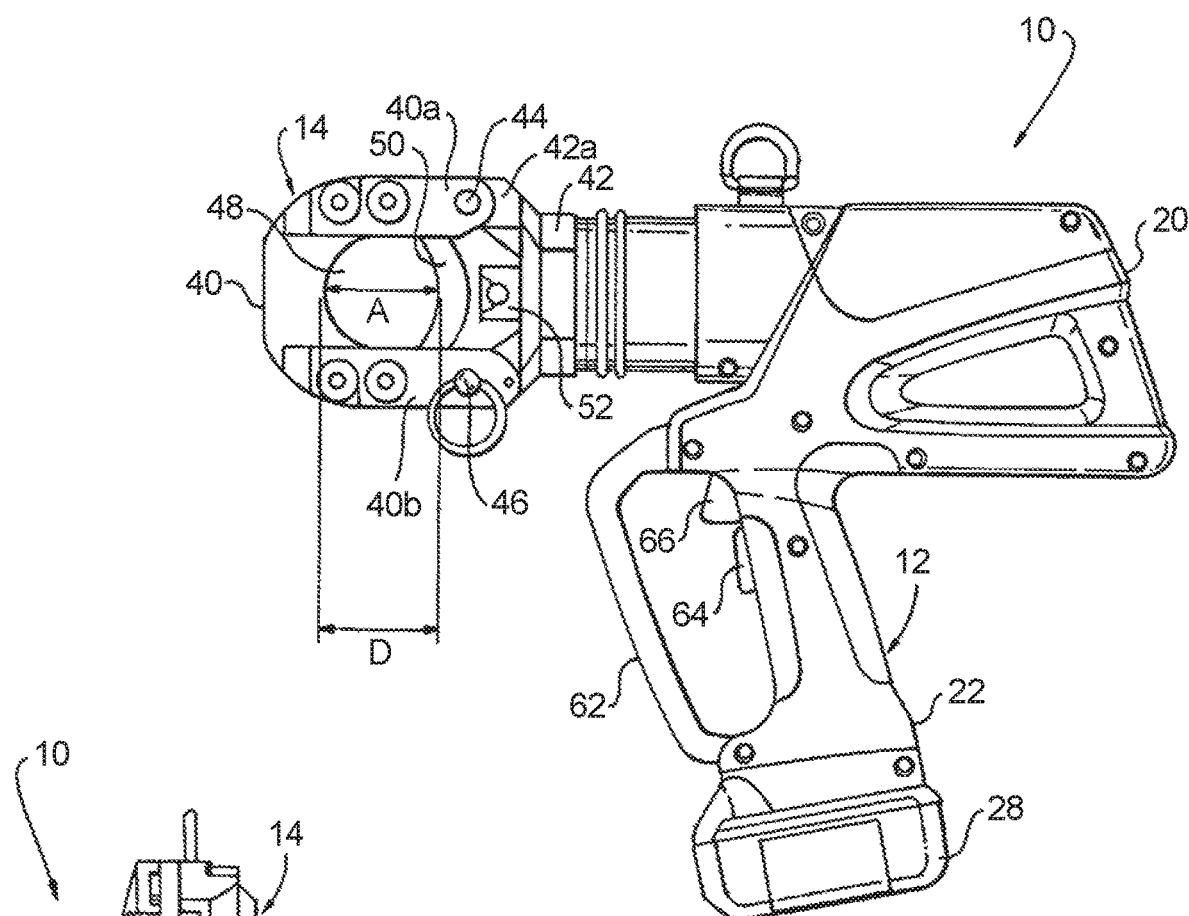
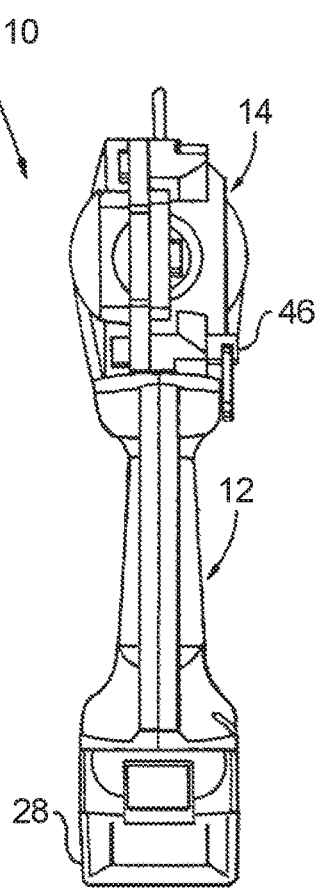
Fig. 1
Fig. 2

PORTABLE HAND TOOL AND KIT

CROSS-REFERENCE TO RELATED APPLICATIONS

This application claims priority to U.S. Provisional Application No. 62/202,592, filed on Aug. 7, 2015, titled "Portable Hand Tool and Kit," which is hereby incorporated herein by reference in its entirety.

BACKGROUND

Field

The present disclosure relates generally to the field of portable hand tools, and more particularly, to portable hand tools with working head assemblies having one or more parts that can be separated and reconnected to perform the particular operation of the working head.

Description of the Related Art

Most portable power tools are hand held tools that use electric motors to drive a working head used to perform various tasks, such as cutting, crimping, drilling, shaping, fastening, grinding, polishing, heating, etc. There is a segment of the portable tool product market that incorporates a hydraulic pump to enable the working head to apply a relatively large amount of force or pressure for a particular task. Such tools may operate with a hydraulic pump actuated by a battery powered electric motor. Battery powered hydraulic power tools are employed in numerous applications to provide an operator with a desired flexibility and mechanical advantage. For example, operators of cutting tools attempting to cut large conductors, e.g., #8 conductors and larger, benefit greatly when hydraulic power is used enabling the operator to apply greater force to quickly cut such large conductors. When cutting electrical conductors and cables, the working head assembly of the tool is typically separated so that the cutting blades of the cutting tool can surround the conductor, and then the working head assembly is reattached prior to activating the tool to perform the cutting operation. A latch pin can be used to releasably secure the parts of the working head assembly together prior to activating the tool.

SUMMARY

The present disclosure provides a tool for operating on an object, e.g., on an electrical conductor. The tool includes a frame, and a working head assembly. The working head assembly has a movable section and fixed section secured to the frame. The movable section has a first end movably secured to a first end of the fixed section. Preferably, the first end of the movable section is pivotably secured to the first end of the fixed section. The movable section has a second end that is releasably secured to a second end of the fixed section using a latch pin. The working head assembly also includes a latch pin stop that is positioned in the second end of the movable section. The latch pin stop is configured to prevent the latch pin from releasable securing the movable section to the fixed section until the movable section is properly aligned with the fixed section. In one embodiment, the latch pin stop is a spring loaded pressure pin.

BRIEF DESCRIPTION OF THE DRAWINGS

The figures depict mebodiments for purposes of illustration only. One skilled in the art will readily recognize from the following description that alternative embodiments of the structure herein may be employed without departing from the principles described herein, wherein:

FIG. 1 is a side view of an exemplary embodiment of a portable hand tool according to the present disclosure;

FIG. 2 is a rear view of the portable hand tool of FIG. 1;

DETAILED DESCRIPTION

The present disclosure provides portable hand tools with a latch pin stop for ensuring proper connection of a movable section of a working head assembly of the portable hand tool relative to a fixed section of the working head assembly, and for ensuring proper operation of the working head assembly. Referring to FIG. 1, there is shown an exemplary embodiment of a portable hand tool 10 according to the present disclosure. The portable hand tool shown in the figures and described herein is a portable, hand-held, battery-operated, hydraulic cutting tool. Examples of such cutting tools that may be adapted to include the novel features of the present disclosure include the Patriot PATCUT2156-LI cutting tool (Appendix 1), and the Patriot PATCUT2156-18V cutting tool (Appendix 2), both of which are manufactured by Burndy, LLC. Although the present disclosure describes the hand tool as a portable, hand-held, battery-operated, hydraulic cutting tool, it should be understood that the tool of the present disclosure is not limited to such cutting tools. Features of the portable hand tool of the present disclosure could also be used in other types of tools, such as a battery operated, hydraulic crimping tools or any other suitable type of portable hand tool. In addition, any suitable size, shape or type of elements or materials can be used to form the shape of the tool frame. For ease of description, the portable, hand held, battery operated, hydraulic cutting tool shown and described herein is referred to as the "tool."

Figure 3:
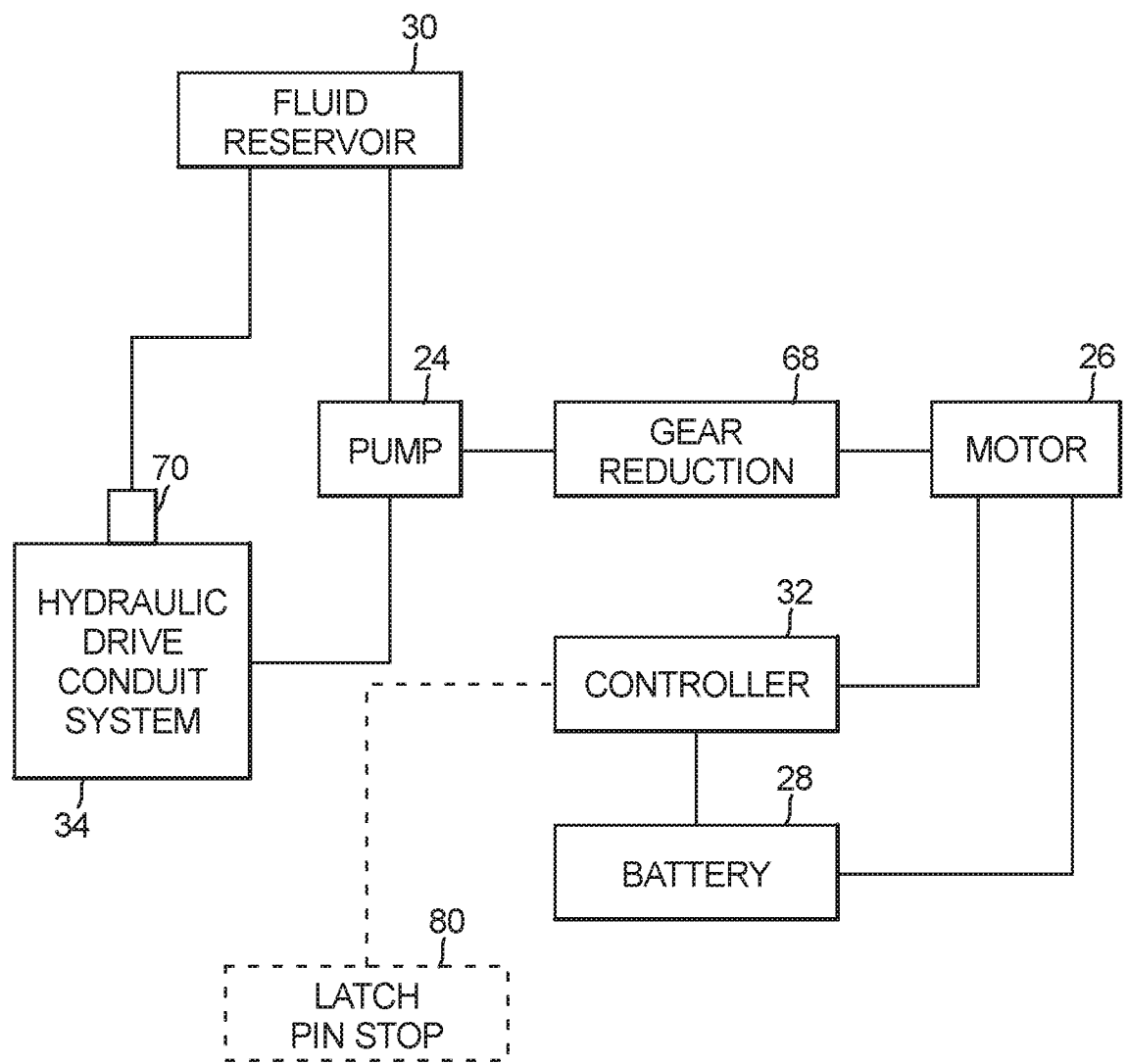
FIG. 3 is a block diagram of components in the portable hand tool of FIG. 1.

Referring to FIGS. 1-3, the tool 10 according to an exemplary embodiment of the present disclosure generally includes frame (or housing) 12 and working head assembly 14. The frame 12 includes a main body 20 and a handle 22 that form a pistol-like shape. However, the frame 12 could be in any suitable type of shape, such as an in-line shape. The frame 12 is connected to and is used to house and support a pump 24, a motor 26, a battery 28, a fluid reservoir 30, a controller 32 and a hydraulic drive conduit system 34. The pump 24, motor 26, fluid reservoir 30, controller 32, and hydraulic drive conduit system 34 are preferably located within the main body 20 of the frame 12.

The working head assembly 14 is attached to the frame 12, and includes a movable section 40 and a fixed section 42. End 40a of the movable section 40 is secured to end 42a of fixed section 42 via a pivot pin 44 such that the movable section 40 can pivot relative to the fixed section between an open position, seen in FIG. 4, and a closed position, seen in FIGS. 1 and 7. End 40b of the movable section 40 is releasably secured to end 42b of fixed section 42 via a latch pin 46 that can be positioned within mounting holes 40c (seen in FIG. 4) in end 40b of the movable section 40 and mounting holes 42c (seen in FIG. 4) in end 42b of the fixed section 42. The fixed section 42 is connected to the front end of the frame 12 and fixed or locked in position, or in some embodiments, the fixed section 42 may be rotatably connected to the frame 12.

As noted above, in this exemplary embodiment the tool 10 is a cutting tool, such that the working head assembly 14 includes cutting blades capable of cutting electrical conductors and cables, including heavy gauge electrical conductors and cables. In this exemplary embodiment, the movable section 40 of the working head assembly 14 includes a fixed cutting blade 48, and the fixed section 42 of the working head assembly 14 includes a movable cutting blade 50. The movable cutting blade 50 is attached to a ram 52 that is part of the hydraulic drive conduit system 34. The ram 52 is movably connected to the fixed section 42 of the working head 14, and adapted to move forward and backward as indicated by arrow "A" seen in FIG. 1. The hydraulic drive conduit system 34 is connected between the pump 24 and the rear end of the ram 52. Hydraulic fluid pumped by the pump 24 through the hydraulic drive conduit system 34 and against the end of the ram 52 causes the ram to move forward toward a distal end of the working head assembly 14, i.e., toward the fixed cutting blade 48. The tool 10 preferably includes a spring (not shown) which is adapted, as is known in the art, to return the ram 52 to its rearward (or home) position when hydraulic fluid is removed from the rear end of the pressure ram 52. The ram 52 has a rear end diameter of about 2 inches. However, the diameter of the rear end of the ram could have any suitable size or shape for functioning as a hydraulic fluid contact surface. In the exemplary embodiment shown in FIG. 1, the ram 52 is adapted to move a distance "D" between its home position and its forward position which is towards the distal end of the working head assembly 14. The distance "D" can be any distance suitable to perform the desired action of the working head assembly 14, here the desired cutting action. For example, the distance "D" could be between about 1 inch and about 2 inches.

Continuing to refer to FIGS. 1 and 2, the handle 22 of the frame 12 may include a hand guard 62 to protect an operators hand while operating the tool 10. The handle 22 includes one or more operator controls, such as trigger switches 64 and 66 that are operatively connected to the controller 32 and/or the motor 26, and can be activated by an operator by, for example, pressing the trigger switches. The operator controls, e.g., trigger switches 64 and 66, are operably coupled to the controller 32, as will be described below. As shown in FIGS. 1 and 2, the battery 28 is removably connected to the bottom of the handle 22. In another embodiment, the battery 28 can be removably mounted or connected to any suitable position on the frame 12. In another embodiment, the battery 28 may be affixed to the tool 10 so that it is not removable. The battery 28 is preferably a rechargeable battery, such as a lithium ion battery, that can output a voltage of at least 16 volts, and preferably in the range of between about 16 VDC and about 24 VDC. In the exemplary embodiment shown in FIGS. 1 and 2, the battery 28 can output a voltage of about 18 VDC.

The motor 26 is coupled to the battery 28 and the controller 32, and its operation is controlled by the controller 32, which will be described in more detail below. Generally, the motor 26 is adapted to operate at a nominal voltage corresponding to the voltage of the battery 28, i.e., between about 16 volts and about 24 volts. For example, if the battery 28 is adapted to output a voltage of about 18 volts, then the motor 26 would be adapted to operate at a voltage of about 18 volts. Under a no-load condition, such a motor 26 can operate at about 19,500 rpm with current of about 2.7 amps. At maximum efficiency, the motor 26 can operate at about 17,040 rpm with a current of about 18.7 amps, a torque of about 153 mN-m (1560 g-cm), and an output of about 273 W. An example of such an 18 volt motor 26 is the RS-775WC-8514 motor, manufactured by Mabuchi Motor Co., Ltd. of Chiba-ken, Japan. However, as noted above, any suitable type of motor adapted to operate above a 16 V nominal voltage could be used. For example, the motor may be a RS-775VC-8015 motor, also manufactured by Mabuchi Motor Co., Ltd., which has a nominal operating voltage of about 16.8 volts. As another example, the motor may be a motor adapted to operate at a 24 V nominal voltage. The output shaft of the motor 26 is connected to the pump 24 by a gear reduction or gearbox 68, and is used to activate the hydraulic drive system. Any suitable type of gear reduction assembly could be provided.

Referring again to FIG. 3, the tool 10 may include a poppet valve 70 connected to the hydraulic drive conduit system 34. The poppet valve 70 is adapted to open when the conduit system 34 reaches a predetermined pressure, such as between about 8000 and about 11,000 psi. When the poppet valve opens, hydraulic fluid being pumped by the pump 24 can exit the conduit system 34 and return to the fluid reservoir 30. The poppet valve 70 can be adapted to generate an audible sound when it opens. This audible sound can signal to the operator that the tool 10 has reached its maximum predetermined hydraulic pressure and, thus, the action of the working head 14, e.g., cutting action, has completed.

In the exemplary embodiment shown in FIG. 3, the controller 32 is adapted to sense a current drop of electricity to the motor 26. When the poppet valve 70 opens, resistance to rotation of the motor 26 is reduced such that the motor draws less current. The controller 32 senses this current drop via a current sensor (not shown), and automatically deactivates the motor 26 for a predetermined period of time. In a preferred embodiment, the predetermined period of time is between about 2 seconds and about 3 seconds. However, any suitable predetermined period of time could be set. In an alternate embodiment, the controller 32 could be adapted to deactivate the motor 26 until a reset button or reset-like procedure is performed by the operator. With this type of system, an operator can sense via a tactile sense, that the motor 26 and pump 24 have stopped and would not need to rely on an audible signal being heard or a visual signal from, for example, an LED positioned on the tool 10. More detailed information of this exemplary embodiment of the tool 10 and its operation can be found in U.S. Pat. No. 7,165,439, titled "Battery Powered Hydraulic Tool," which is incorporated herein by reference.

Figure 4:
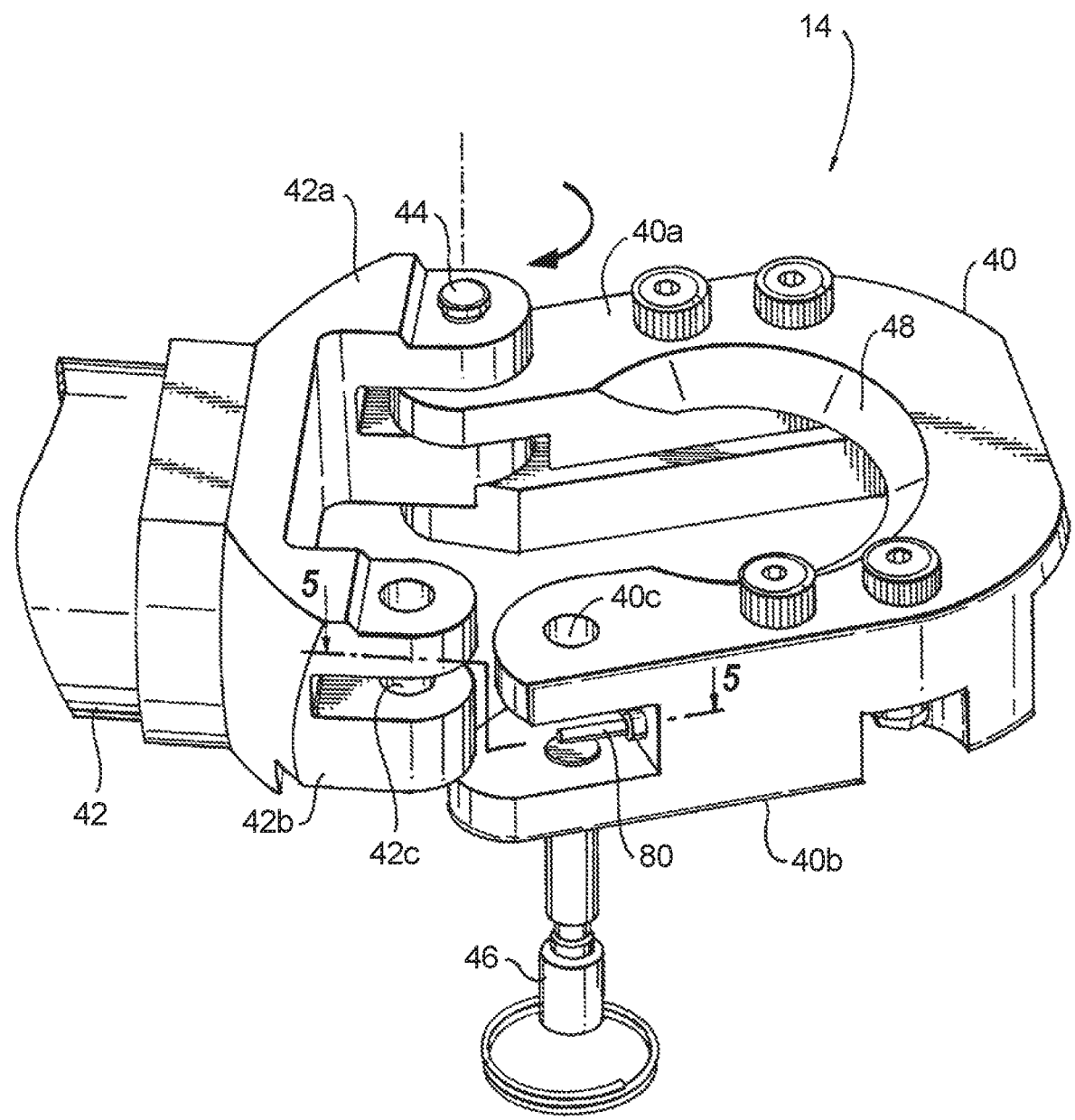
FIG. 4 is a perspective view of an exemplary embodiment of a working head assembly for the portable hand tool of FIG. 1.
Figure 5:
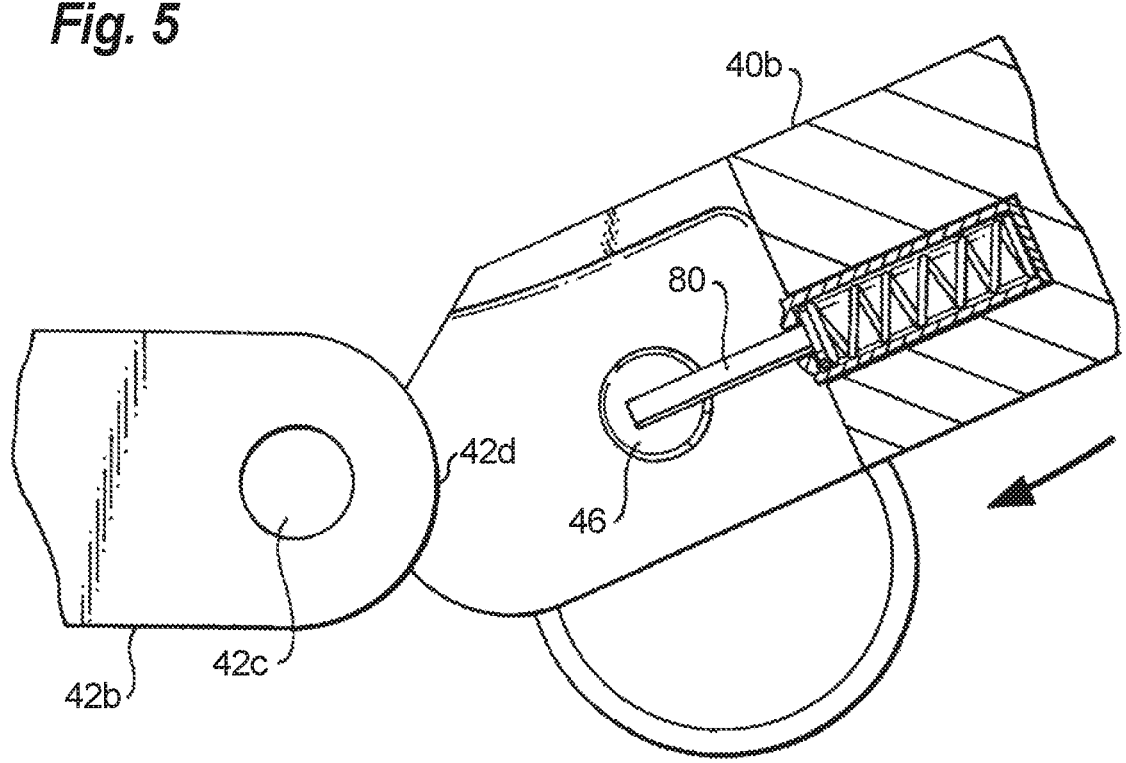
FIG. 5 is a side sectional view of a portion of the working head assembly of FIG. 4, illustrating an exemplary embodiment of a latch pin stop according to the present disclosure.
Figure 6:
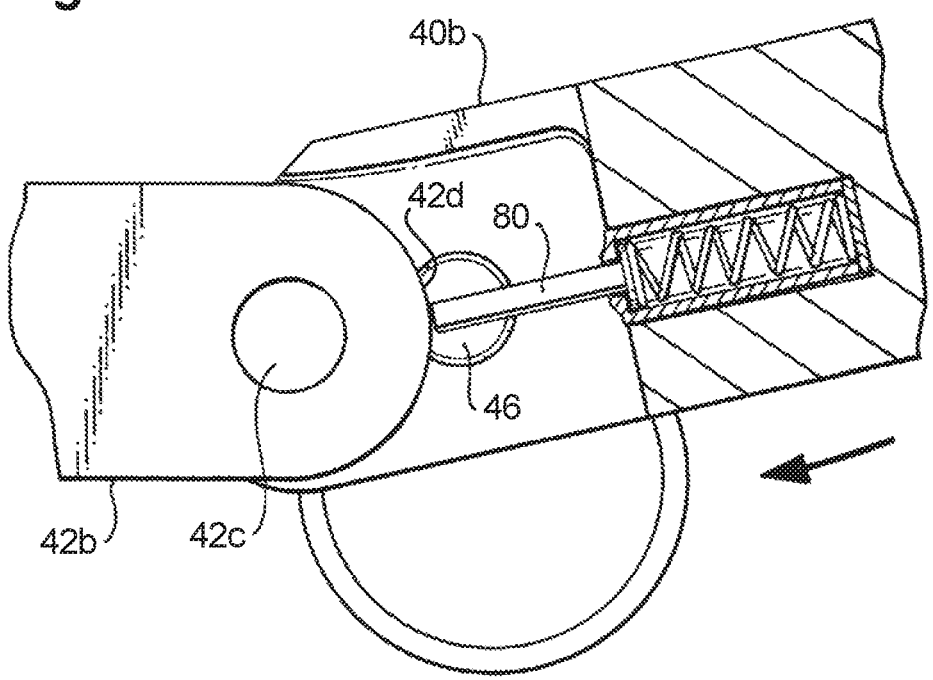
FIG. 6 is a side sectional view of the portion of the working head assembly of FIG. 4, illustrating a movable section of the working head assembly having a latch pin stop according to the present disclosure, where the latch pin stop is in an extended blocking position.
Figure 7:
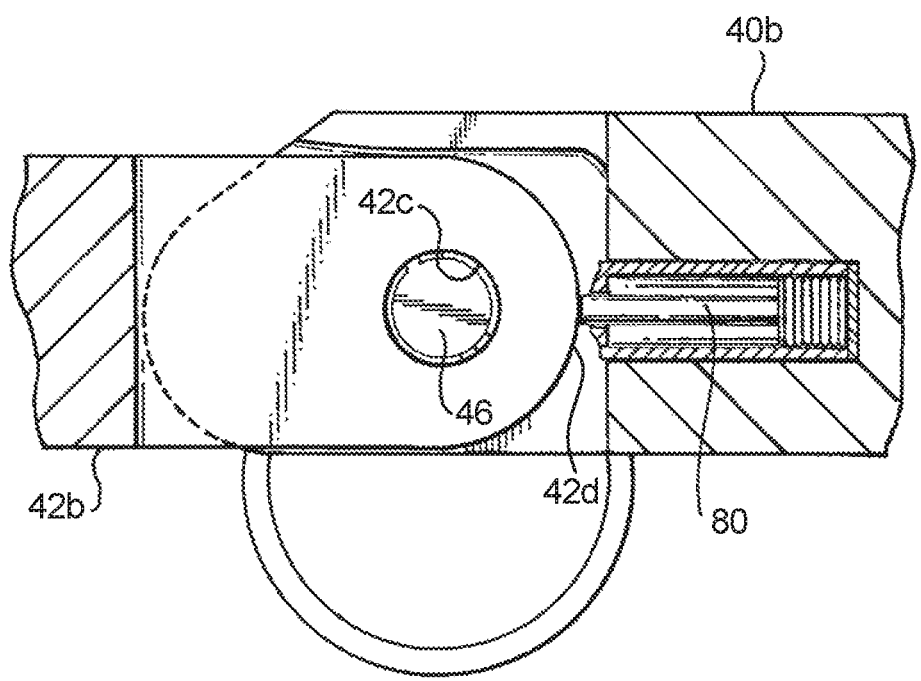
FIG. 7 is a side sectional view of the portion of the working head assembly of FIG. 4, illustrating the movable section of the working head assembly connected to a fixed portion of the working head assembly and the latch pin stop in a retracted position.

Referring to FIGS. 4-7, an exemplary embodiment of the working head assembly 14 of the tool 10 is shown. As noted above, the working head assembly 14 has the movable section 40 and the fixed section 42, wherein the fixed section 42 is secured to the frame 12 and the first end 40a of the movable section 40 that is pivotably secured to the first end 42a of the fixed section 42 and the second end 40b of the movable section 40 is releasably secured to the second end 42b of the fixed section 42 via the latch pin 46. The movable section 40 is movable between an open position where, for example, an electrical conductor can be placed between the blades 48 and 50 of the cutting tool, and a closed position where the tool can be activated to perform its designed operation, here a cutting operation. The working head assembly 14 according to the present disclosure also includes a latch pin stop 80 that prevents the latch pin 46 from being inserted into the mounting holes (apertures) 40c and 42c unless the movable section 40 is properly positioned or aligned relative to the fixed section 42. The movable section 40 is properly positioned with the fixed section 42 when the apertures 40c and 42c are substantially axially aligned such that the latch pin 46 is free to pass through both apertures 40c and 42c. More specifically, when the movable section 40 is disconnected from the fixed section 42 by removing the latch pin 46 from mounting holes 40c and 42c, and separating the movable section from the fixed section, the latch pin stop 80 automatically extends to an active position where the latch pin stop can block insertion of the latch pin into the aperture 40c without extending through aperture 42c, as seen in FIGS. 4 and 5. When the movable section is positioned for attachment to the fixed section, seen in FIG. 6, the latch pin stop engages wall 42d of the fixed section 42. As the moveable section 40 is further inserted into position for attachment to the fixed section 42, the latch pin stop 80 moves to a retracted position such that the latch pin stop no longer inhibits insertion of the latch pin 46 into the mounting holes 40c and 42c, and the movable section 40 can then be releasably secured to the fixed section 42 via the latch pin 46, as seen in FIG. 7. In some embodiments the latch pin stop 80 is a detent pin. In some embodiments the detent pin is spring-loaded. In the embodiment shown in FIGS. 4-7, the latch pin stop is a spring-loaded pressure pin that is normally biased in the extended position.

Figure 8:
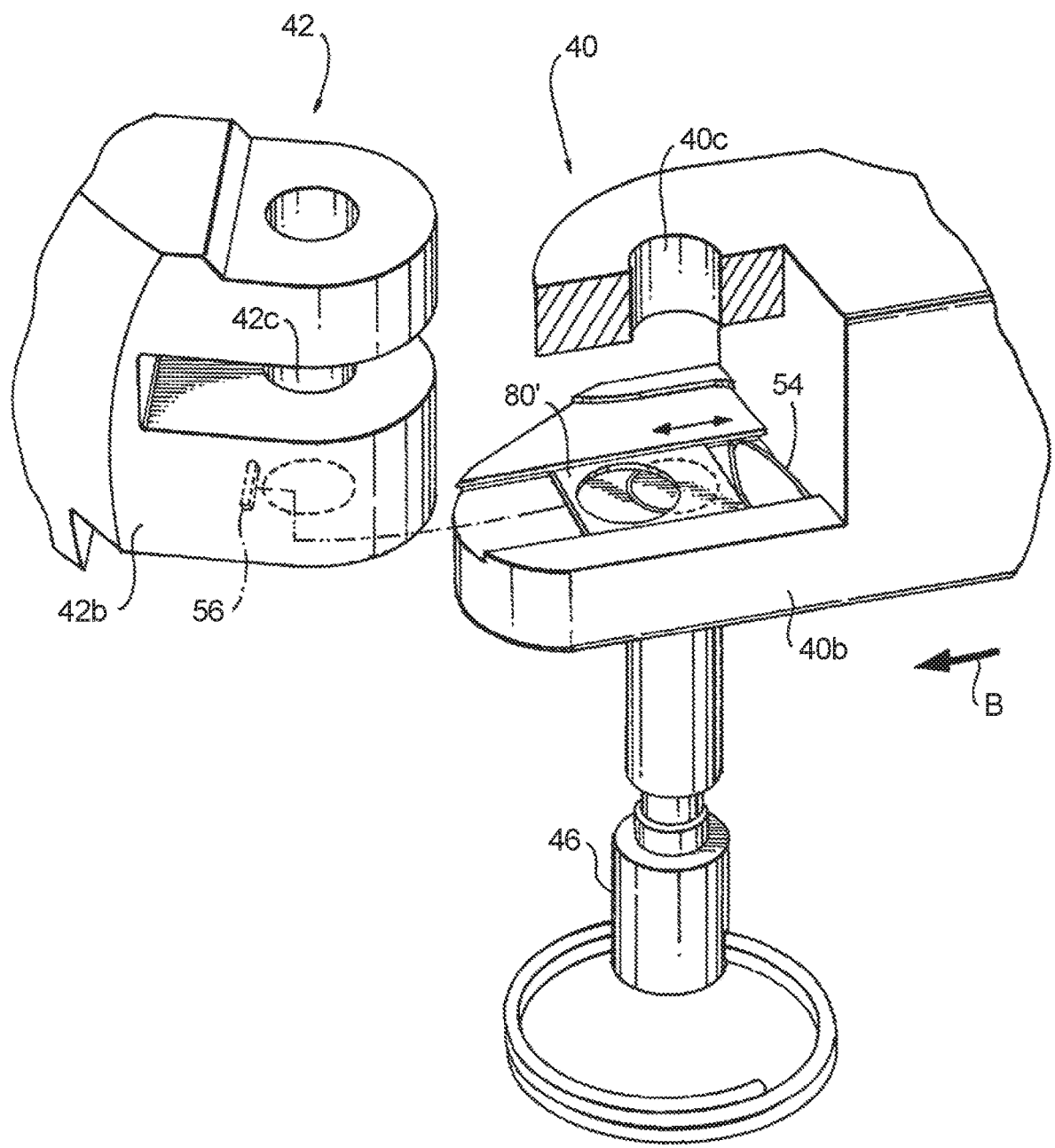
FIG. 8 is a perspective view of a working head assembly similar to FIG. 4, and illustrating another exemplary embodiment of the latch pin stop according to the present disclosure.

Referring to FIG. 8, another embodiment of the latch pin stop is shown. In this exemplary embodiment, the latch pin stop includes an extendable sliding keyhole type window 80'. In some embodiments, the sliding keyhole type window 80' has an aperture shaped like a keyhole, however, the aperture is not limited to any particular shape as long as it includes a round aperture corresponding to mounting hole 40c, as shown in FIG. 8. The window 80' would normally extend by sliding in the direction of arrow "B", biased by a spring 54, over the mounting hole 40c, when the movable section 40 of the working head assembly 14 is in the open position. As a result, the keyhole type opening would not be aligned with the mounting hole 40c and would thus inhibit the latch pin 46 from entering the mounting hole 40c until the movable section 40 of the working head assembly 14 is in the closed position, where a biasing arm 56 would cause the latch pin stop 80' to move in a direction opposite direction "B" Once the movable section 40 is aligned with the fixed section 42 of the working head assembly 14, the round area of the keyhole type opening in the latch pin stop 80' would allow the latch pin 46 to pass through the latch pin stop 80' and the mounting holes 40c and 42c.

Figure 9:
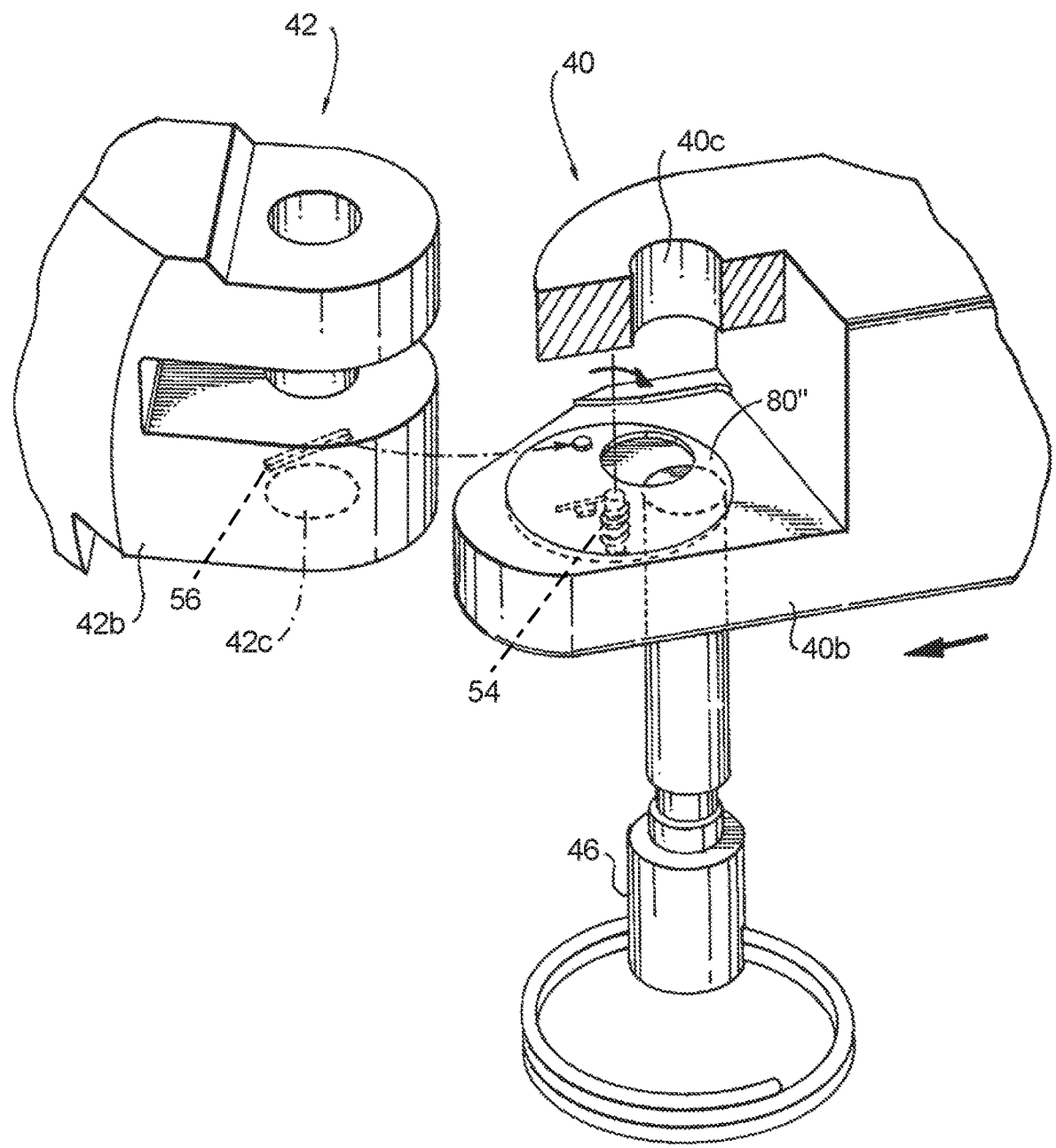
FIG. 9 is a perspective view of a working head assembly similar to FIG. 4, and illustrating another exemplary embodiment of the latch pin stop according to the present disclosure.

Referring to FIG. 9, another embodiment of the latch pin stop is shown. In this exemplary embodiment, the latch pin stop includes an extendable rotating keyhole type window 80". The window 80" would normally rotatably extend by rotating counter clockwise, biased by a spring 54, over the mounting hole 40c, when the movable section 40 of the working head assembly 14 is in the open position as shown in FIG. 9. As a result, the smaller portion of the opening would inhibit the latch pin 46 from entering the mounting hole 40c until the movable section 40 of the working head assembly 14 is in the closed position, where a biasing arm 56 would cause the latch pin stop 80" to rotate clockwise. Once the movable section 40 is aligned with the fixed section 42 of the working head assembly, the larger area of the opening would allow the latch pin 46 to pass through the mounting holes 40c and 42c.

Additional examples of exemplary embodiments of the latch pin stop include; a rigid window or blade structure that toggles between a normally closed position and an open position when the blade structure engages the fixed section so that the latch pin can pass through mounting holes 40c and 42c. In another exemplary embodiment, the latch pin stop can be a magnetically operated stop that normally blocks the passage of the latch pin into the mounting holes, and when end 40b of movable section 40 is moved in position for attachment to end 42b of fixed section 42 a magnetic field causes the latch pin stop to move such that the stop does not block passage of the latch pin into the mounting holes. In another embodiment, the latch pin stop 80 may be electrically connected to the controller 32, such that when the latch pin stop is in the extended position, seen in FIG. 4, the controller 32 disables the motor 26 so that the working head assembly 14 of the tool 10 cannot be activated.

Figure 10:
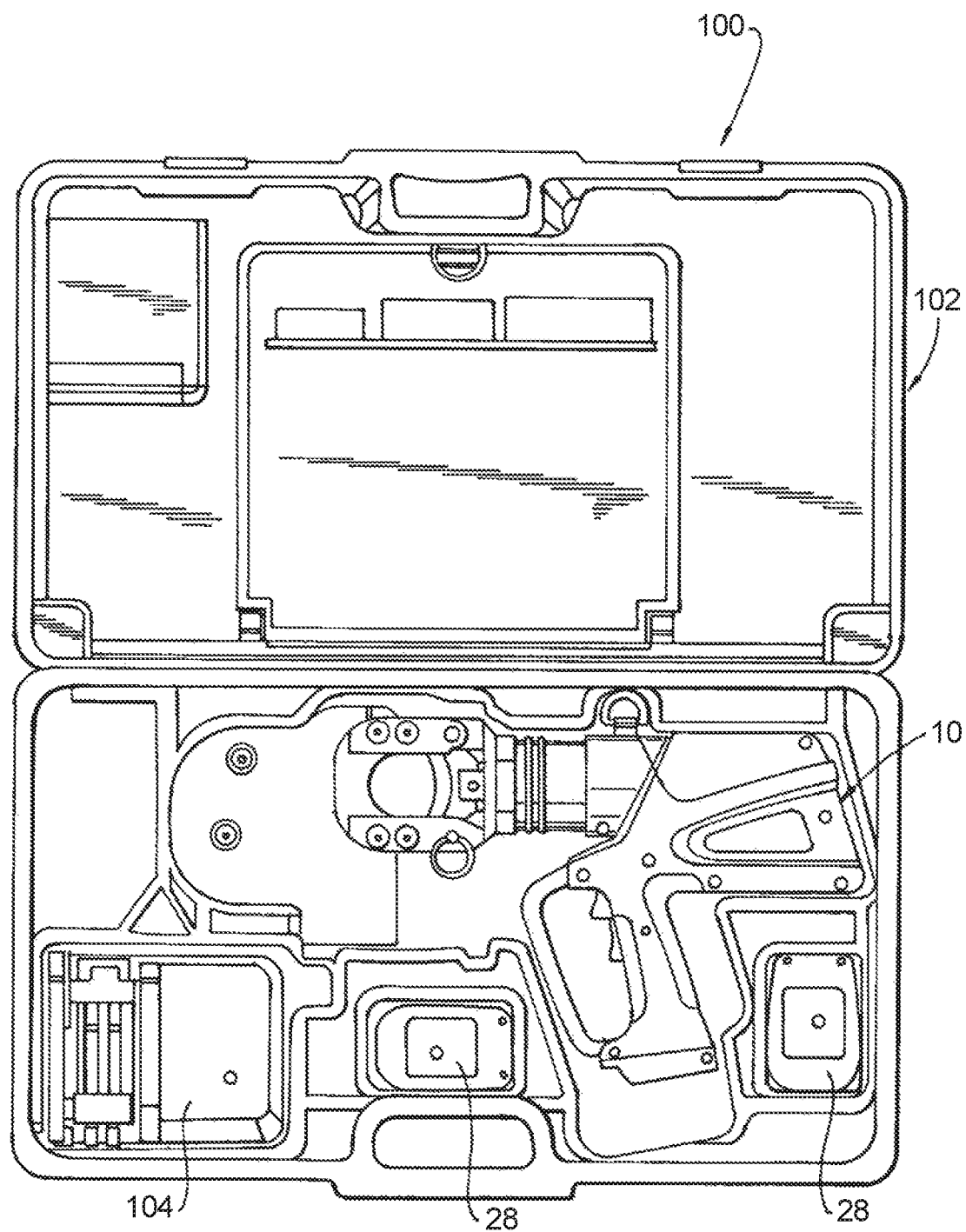
FIG. 10 is a top plan view of a tool kit according to the present disclosure, illustrating a carrying case, the portable hand tool of FIG. 1; a battery charger and two batteries.

Referring now to FIG. 10, an exemplary tool kit according to the present disclosure is provided. In this exemplary embodiment, the tool kit 100 includes a case 102 configured to house the tool 10, a battery charger 104 and one or more batteries 28.

In some embodiments, a tool for operating on an object is disclosed that includes a frame and a working head assembly having a movable section and fixed section, wherein the fixed section is secured to the frame, and wherein the movable section has a first end movably secured to a first end of the fixed section and a second end of the movable section is releasably secured to a second end of the fixed section using a latch pin. The tool also includes a latch pin stop extensibly positioned in the second end of the movable section and configured to prevent the latch pin from securing the second end of the movable section to the second end of the fixed section unless an aperture in the second end of the movable section is axially aligned with an aperture in the second end of the fixed section.

In some embodiments, a tool for operating on an object is disclosed that includes a frame and a working head assembly having a movable section and fixed section, wherein the fixed section is secured to the frame, and wherein the movable section has a first end movably secured to a first end of the fixed section and a second end of the movable section is releasably secured to a second end of the fixed section using a latch pin. The tool also includes a latch pin stop extensibly positioned in the second end of the movable section, wherein the latch pin stop blocks the latch pin from extending through an aperture in the second end of movable section unless the latch pin is extending through an aperture in the second end of the fixed section.

In some embodiments, a tool for cutting an electrical cable is disclosed that includes a frame, wherein the frame is connected to a motor, the motor is connected by a shaft to a hydraulic fluid pump, the hydraulic fluid pump is coupled to a fluid reservoir and a hydraulic drive conduit system. The tool also includes a working head assembly having a movable section and fixed section, wherein the fixed section is secured to the frame, and wherein the movable section has a first end pivotably secured to a first end of the fixed section and a second end of the movable section is releasably secured to a second end of the fixed section using a latch pin. The tool further includes a latch pin stop extensibly positioned in the second end of the movable section and configured to prevent the latch pin from securing the second end of the movable section to the second end of the fixed section unless an aperture in the second end of the movable section is axially aligned with an aperture in the second end of the fixed section, wherein the latch pin stop is one of a spring-loaded pressure pin and a spring-loaded detent pin.

The foregoing specification provides a description with reference to specific exemplary embodiments. The specification and drawings are to be regarded in an illustrative sense rather than a restrictive sense. Various modifications may be made thereto without departing from the spirit and scope as set forth in the following claims.

What is claimed is:

1. A tool for operating on an object, comprising:
   a frame;
   a working head assembly having a first section and a second section, the first section having a proximal end and a distal end wherein the distal end comprises a pair of aligned mounting holes, and the second section having a proximal end and a distal end wherein the distal end comprises at least one mounting hole, wherein one of the first and second sections is a fixed section fixedly secured to the frame and another one of the first and second sections is a movable section with the proximal end of the movable section movably secured to the proximal end of the fixed section and the distal end of the movable section releasably secured to the distal end of the fixed section using a latch pin extending through the pair of aligned mounting holes and through the at least one mounting hole; and
   a latch pin stop extendably positioned in said working head assembly such that the latch pin stop when in an extended position is disposed between the pair of aligned mounting holes to prevent the latch pin from extending from one of the pair of aligned mounting holes to the other one of the pair of aligned mounting holes, wherein the latch pin stop is in a retracted position when a portion of the distal end of the second section is disposed between the pair of aligned mounting holes and the pair of aligned mounting holes are axially aligned with the at least one mounting hole.

2. The tool according to claim 1, wherein the proximal end of the movable section movably secured to the proximal end of the fixed section comprises the proximal end of the movable section being pivotably secured to the proximal end of the fixed section.

3. The tool according to claim 1, wherein the latch pin stop is one of a spring-loaded pin, a sliding keyhole window, and a rotating keyhole window.

4. The tool according to claim 1, wherein the frame is connected to a motor, the motor is connected to a hydraulic fluid pump, and the hydraulic fluid pump is coupled to a fluid reservoir and a hydraulic drive conduit system.

5. The tool according to claim 4, wherein the motor is electrically coupled to a battery and a controller.

6. The tool according to claim 5, wherein the battery is removably connected to the frame.

7. The tool according to claim 4, further comprising:
   a poppet valve connected between the fluid reservoir and the hydraulic drive conduit system.

8. The tool according to claim 7, wherein the poppet valve opens at a predetermined pressure allowing hydraulic fluid to flow from the hydraulic drive conduit system to the fluid reservoir, and wherein an audible noise is produced by the poppet valve when it opens.

9. A tool for operating on an object, comprising:
   a frame;
   a working head assembly having a first section and a second section, the first section having a proximal end and a distal end wherein the distal end comprises a pair of aligned mounting holes, and the second section having a proximal end and a distal end wherein the distal end comprises at least one mounting hole, wherein one of the first and second sections is a fixed section fixedly secured to the frame and another one of the first and second sections is a movable section with the proximal end of the movable section movably secured to the proximal end of the fixed section and the distal end of the movable section releasably secured to the distal end of the fixed section using a latch pin extending through the pair of aligned mounting holes and through the at least one mounting hole; and
   a latch pin stop extendably positioned in said working head assembly such that the latch pin stop when in an extended position is disposed between the pair of aligned mounting holes to block the latch pin from extending through both of the pair of aligned mounting holes, the latch pin stop being in a retracted position when a portion of the distal end of the second section is disposed between the pair of aligned mounting holes and the latch pin is extending through at least one of the pair of mounting holes and through the at least one mounting hole.

10. The tool according to claim 9, wherein the proximal end of the movable section movably secured to the proximal end of the fixed section comprises the proximal end of the movable section being pivotably secured to the proximal end of the fixed section.

11. The tool according to claim 9, wherein the latch pin stop is one of a spring-loaded pin, a sliding keyhole window, and a rotating keyhole window.

12. The tool according to claim 9, wherein the frame is connected to a motor, the motor is connected to a hydraulic fluid pump, and the hydraulic fluid pump is coupled to a fluid reservoir and a hydraulic drive conduit system.

13. The tool according to claim 12, wherein the motor is electrically coupled to a battery and a controller.

14. The tool according to claim 13, wherein the battery is removably connected to the frame.

15. The tool according to claim 12, further comprising:
    a poppet valve connected between the fluid reservoir and the hydraulic drive conduit system.

16. The tool according to claim 15, wherein the poppet valve opens at a predetermined pressure allowing hydraulic fluid to flow from the hydraulic drive conduit system to the fluid reservoir, and wherein an audible noise is produced by the poppet valve when it opens.

17. A tool for cutting an electrical cable, comprising:
a frame, wherein the frame is connected to a motor, the motor is connected to a hydraulic fluid pump, and the hydraulic fluid pump is coupled to a fluid reservoir and a hydraulic drive conduit system;
a working head assembly having a first section and a second section, the first section having a proximal end and a distal end wherein the distal end comprises a pair of aligned mounting holes, and the second section having a proximal end and a distal end wherein the distal end comprises at least one mounting hole, wherein one of the first and second sections is a fixed section fixedly secured to the frame and another one of the first and second sections is a movable section with the proximal end of the movable section movably secured to the proximal end of the fixed section and the distal end of the movable section releasably secured to the distal end of the fixed section using a latch pin extending through the pair of aligned mounting holes and through the at least one mounting hole, the movable section including a cutting blade; and
a latch pin stop extendably positioned in said working head assembly such that the latch pin stop when in an extended position is disposed between the pair of aligned mounting holes to prevent the latch pin from extending through the pair of aligned mounting holes, wherein the latch pin stop is in a retracted position when a portion of the distal end of the second section is disposed between the pair of aligned mounting holes and the pair of aligned mounting holes are axially aligned with the at least one mounting hole,
wherein the latch pin stop is one of a spring-loaded pin, a sliding keyhole window, and a rotating keyhole window.

18. The tool according to claim 17, wherein the motor is electrically coupled to a battery and a controller.

19. The tool according to claim 18, wherein the battery is removably connected to the frame.

20. The tool according to claim 17, further comprising:
a poppet valve connected between the fluid reservoir and the hydraulic drive conduit system.

21. The tool according to claim 20, wherein the poppet valve opens at a predetermined pressure allowing hydraulic fluid to flow from the hydraulic drive conduit system to the fluid reservoir, and wherein an audible noise is produced by the poppet valve when it opens.

* * * * *